Figures 1, 2, 3:
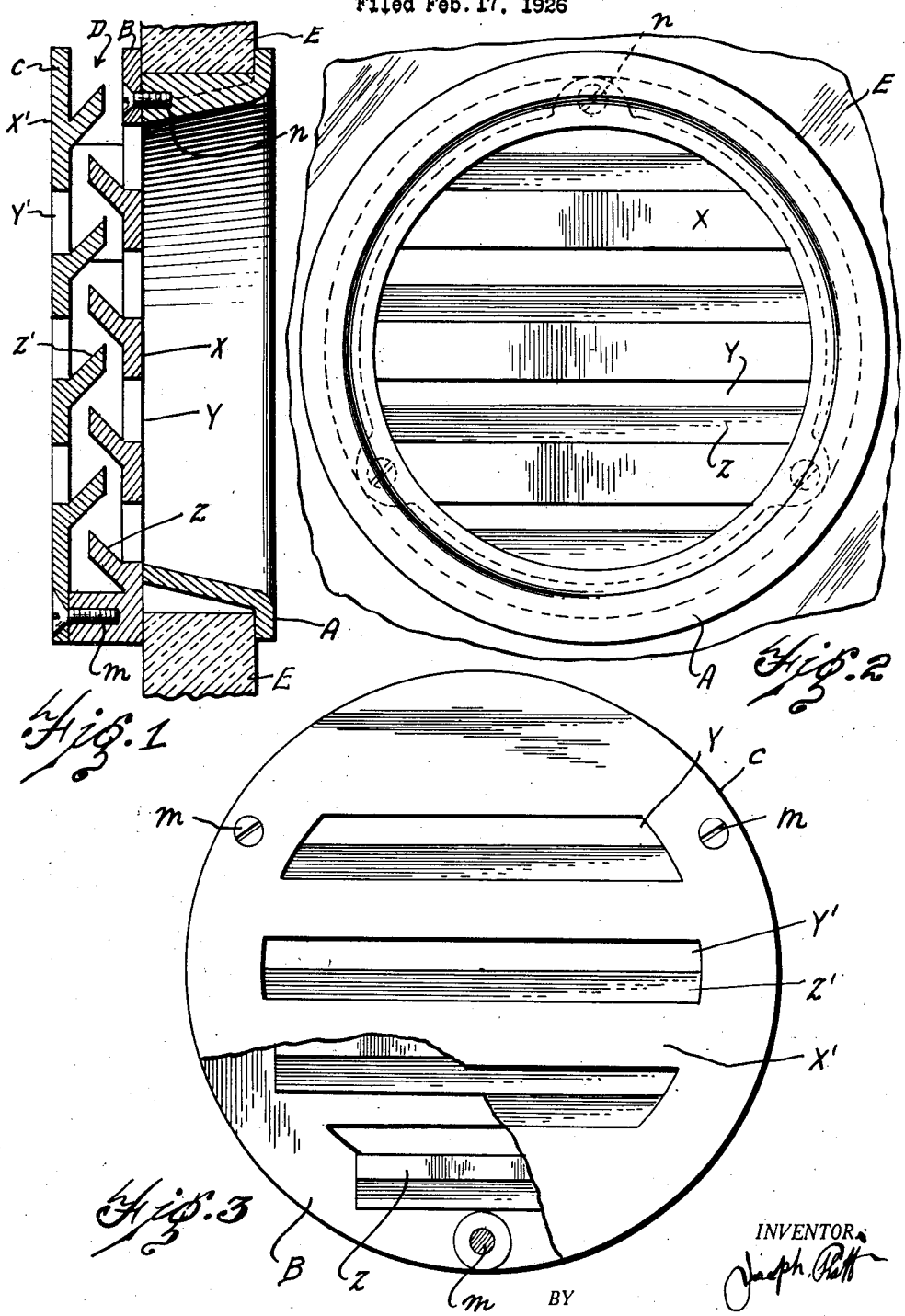

April 17, 1928.

J. PLATT 1,666,303

AMPLIFIER

Filed Feb. 17, 1926

INVENTOR,
Joseph Platt
BY

ATTORNEY.

Patented Apr. 17, 1928.

1,666,303

UNITED STATES PATENT OFFICE.

JOSEPH PLATT, OF DETROIT, MICHIGAN.

AMPLIFIER.

Application filed February 17, 1926. Serial No. 88,871.

The present invention relates to amplifiers adapted particularly for banking institutions, and has for an object to provide a bullet proof amplifier which may be used in connection with the usual bullet proof fixtures for such institutions or any institution.

The object of my invention is to provide an apparatus through which sounds may pass and yet prevent the passage of bullets or any instrument.

Another object of my invention is to have an amplifier which affords close contact between two persons separated by a partition, preferably of some bullet proof material, and yet prevent a gun, bullet or any instrument to pass through the amplifier without preventing sound passing back and forth through the amplifier.

Another object of my invention is to provide an amplifier which will permit sounds passing through it, and yet break the force of the wind passing through it, and also serve as a barrier to dust particles or foreign substances passing through it.

A further object of my invention is to provide a bullet proof amplifier adapted particularly for bullet proof fixtures that consists of any number of layers of any desired shape, preferably two layers, and preferably of a bullet proof material, assembled together or made as one piece in such a way that the shields, or projecting parts of the layers, attached to the layers or made a part thereof, prevent a bullet or any instrument from passing through the layers and yet permit sounds to pass back and forth through the layers, to which may be attached or made a part thereof a collar of preferably a bullet proof material.

A still further object of my invention is to provide a device which will be extremely simple, durable and inexpensive in construction, one which is efficient and reliable in operation and will be adapted to the purpose for which it is designed.

The above and other objects and features and advantages of the invention are obtained by certain improvements in an amplifier consisting in general of certain novel details of construction and especially of combination of parts thereof in connection with bullet proof fixtures, and will appear from a detailed construction of certain embodiments of the amplifier illustrated in accompanying drawings which will now be considered to explain the mechanical construction of the amplifier which will be hereinafter more fully described and later claimed distinctly and in connection with other fixtures especially those made of a bullet-proof material.

Figure 1— is a cross section of the amplifier constructed in accordance with my invention.

Figure 2— is a front elevation thereof.

Figure 3— is a rear elevation thereof.

Referring more particularly to the different views set forth in the accompanying drawing, the letter A designates the layer called the collar, made preferably of bullet proof substance, and it may be constructed in any particular manner, but preferably of a size and design to afford proper amplification, and serve as a suitable mouth piece, to which an adjoining substance, preferably of some bullet proof material, may be attached.

The letter B represents the layer called the collar or exterior guard which is primarily exposed to a bullet or sharp instrument sent forth by one in front of the collar or mouth piece through the opening in same. The collar guard (B) may be attached to the collar or it may itself serve both as collar and a guard.

Letter C indicates the layer called the interior or final guard which is secondarily exposed to a bullet or sharp instrument sent forth by one in front of the collar or mouth piece through the opening of same.

Guards B and C may be interchangeable and each perform the work of the other, provided they are assembled in a position as indicated in the drawings and not with the smooth surfaces back to back.

Both the exterior and interior guards, B and C, are made of some suitable material, preferably of a bullet proof substance with a size and shape convenient to the user, but preferably of sufficient strength to resist a bullet or sharp instrument.

In both the exterior and interior guards, B and C, are found openings in the surface designated as ($y$) and ($y'$) respectively and shields or prongs lettered ($z$) and ($z'$) respectively, preferably made of some bullet proof material attached to the guards or made a part thereof, whereas that part of the exterior and interior guards comprising the entire surface of the guards exclusive of the shields or prongs and the openings aforementioned, are denominated the guards proper, lettered ($x$) and ($x'$) and are preferably made of some bullet proof material. The number of shields used in one guard is solely dependent upon the number of openings in the other guard. Each shield may guard a network of openings joined together and considered as one unit.

The shields or prongs ($z'$) and ($z$) are projected from the guards proper ($x'$) and ($x$) in such a way that the shields of one guard complement the openings of the other guard, whose shields in turn supplement the openings of the opposite guard, so that the openings of each guard are completely covered by the shields of the other guard, and the guard proper of one guard forms with the shields of the other guard an absolute barrier to any bullet or sharp instrument passing in either direction through both guards.

Any number of pairs of exterior and interior guards may be used, assembled substantially as hereinbefore set forth.

Either the exterior or interior guard may have such attachments as may be necessary to enable it to serve both as a collar or mouth piece and amplifier and as a guard, thus eliminating the necessity of the collar, or mouth piece and amplifier.

Instead of a wide opening in the collar there may be perforated holes therein or any other means desired to prevent dust or instruments from passing through the amplifier.

The guards, B and C are assembled together by connecting means ($m$) such as machine screws, forming the space D, whose size and shape depend upon the size of the openings and shields of the guards B and C.

The collar A is attached to either guard B or C, preferably to the guard used as the exterior guard by a connecting means ($n$) such as a machine screw.

It is thought that the utility of my invention will be apparent without further description. While I have described the preferred embodiment of my invention, and have illustrated the same in the accompanying drawings, certain minor changes or alterations may appear to one skilled in the art to which this invention relates, during the extensive manufacture of the same, and I therefore reserve the right to make such alterations or changes as shall fairly fall within the scope of the appended claims.

I claim:

1. In a construction of the kind described, the combination of two sets of shields in parallel, and spaced relation, each set of shields consisting of individual shields arranged parallel to each other and inclined to the plane of the set with a space between adjacent shields, the sets being so arranged with reference to each other that a shield in one set shall cover a space in the other set.

2. In a construction of the kind described, the combination of two sets of shields in parallel, and spaced relation, each set of shields consisting of individual shields arranged parallel to each other and inclined to the plane of the set with a space between adjacent shields, the sets being so arranged with reference to each other that a shield in one set shall cover a space in the other set, each shield having an extension from its inner edge parallel to the planes of the set.

JOSEPH PLATT.